United States Patent [19]

Beall

[11] Patent Number: 4,687,749

[45] Date of Patent: Aug. 18, 1987

[54] REFRACTORY GLASS-CERAMICS CONTAINING ENSTATITE

[75] Inventor: George H. Beall, Big Flats, N.Y.

[73] Assignee: Corning Glass Works, Corning, N.Y.

[21] Appl. No.: 922,948

[22] Filed: Oct. 24, 1986

[51] Int. Cl.$^4$ .................... C03C 10/04; C03C 10/14; C03C 10/06

[52] U.S. Cl. .......................................... 501/5; 501/4; 501/8; 501/9

[58] Field of Search ................................ 501/4, 5, 9, 8

[56] References Cited

U.S. PATENT DOCUMENTS

| | | | |
|---|---|---|---|
| 3,205,079 | 9/1965 | Stookey | 501/9 |
| 3,490,888 | 1/1970 | Strong | 501/9 |
| 3,585,054 | 6/1971 | Korstetter | 501/9 |
| 3,819,387 | 6/1974 | Leger | 501/4 |
| 3,873,329 | 3/1975 | Beall | 501/4 |
| 3,901,716 | 8/1975 | Rogers et al. | 501/5 |

*Primary Examiner*—Mark L. Bell
*Attorney, Agent, or Firm*—C. S. Janes, Jr.

[57] ABSTRACT

This invention is concerned with the production of glass-ceramic articles wherein enstatite constitutes the predominant crystal phase. Compositions exhibiting a high modulus of rupture, a use temperature in excess of 1200° C., and a high fracture toughness consist essentially, expressed in terms of weight percent on the oxide basis, of about 20–35% MgO, 2–12% $Al_2O_3$, 40–70% $SiO_2$, and at least one metal oxide in the indicated proportions selected from the group consisting of 0–2% $Li_2O$, 0–4% CaO, 0–12% SrO, and 0–17% BaO, at least 0.5% $Li_2O$ being required when present alone and at least 1% SrO and/or BaO being required in the absence of $Li_2O$. Compositions exhibiting a use temperature of 1500° C. consist essentially, expressed in terms of weight percent on the oxide basis, of about 30–35% MgO, 53–58% $SiO_2$, and 10–14% $ZrO_2$.

5 Claims, No Drawings

REFRACTORY GLASS-CERAMICS CONTAINING ENSTATITE

BACKGROUND OF THE INVENTION

Based upon the success obtained in prior research in developing glass-ceramic bodies exhibiting high strength and toughness wherein the predominant crystal phase is a relatively low-melting chain silicate (canasite in U.S. Pat. No. 4,386,162 and potassium fluorrichterite in U.S. Pat. No. 4,467,039), research was initiated to determine whether glass-ceramic bodies could be devised containing the chain silicate enstatite ($MgO \cdot SiO_2$) as the predominant crystal phase. Enstatite is significantly more refractory than canasite and the richterites, having a melting point in excess of 1500° C.

Not only is enstatite a chain silicate having a capability for interlocking acicular microstructural development, but also it demonstrates martensitic-type transformations, viz., protenstatite—orthoenstatite upon cooling below 1000° C. and orthoenstatite—clinoenstatite, when subjected to shear stress. ("Experimental Study on the Polymorphism of Enstatite", *Am. Mineral,* 59, 345 1974). These transformations are known to develop such microstructural laminations as twinning and exsolution which can retard fracture and increase toughness. Furthermore, the stress-sensitive coversion to the monoclinic polymorph has been shown to induce plastic flow at temperatures as low as 25 C. in compression tests under confining pressure. ("Experimental Deformation of Enstatite and Accompanying Inversion to Clinoenstatite", F. J. Turner, H. Heard, and D. T. Griggs, *Int. Geol. Cong. Rep. Sess. Norden* 21st. pr. 18, 399, 1960).

Glass-ceramics are produced through the controlled crystallization of precursor glass bodies. Hence, glass-ceramics are commonly prepared by means of the following three general steps: (1) a glass-forming batch, customarily containing a nucleating agent, is melted; (2) the melt is cooled below the transformation range thereof and simultaneously a glass body of a desired configuration shaped therefrom; and (3) the glass shape is exposed to a predetermined heat treatment to cause the growth of crystals in situ. Frequently, to secure a more uniform crystallization in the final product, the heat treatment will be conducted in two steps: first, the glass shape will be heated to a temperature within or somewhat above the transformation range for a period of time sufficient to develop nuclei therein; and, second, the temperature will be raised to approach and often exceed the softening point of the glass to effect the growth of crystals on the nuclei. (The transformation range has been defined as that temperature at which a liquid melt becomes an amorphous solid; that temperature generally being deemed to reside in the vicinity of the annealing point of the glass.)

Glass-ceramics are customarily highly crystalline, i.e., at least 50% by volume crystalline and, frequently, approaching 100%. Because the crystals are grown in situ on previously-developed nuclei, glass-ceramics are non-porous and free of voids, and the crystals are relatively uniformly-sized and homongenously dispersed in a residual glassy matrix. Glass-ceramics demonstrate physical and chemical properties more closely akin to those of the crystal phase than to those of the parent glass due to the high percentage of crystallinity therein. Finally, the composition of the residual glassy matrix will be different from that of the original glass since the components of the crystal phase will have been removed therefrom.

U.S. Pat. No. 2,920,971, the basic patent in the field of glass-ceramics, provides an extensive discussion with respect to the mechanisms involved in the production of glass-ceramics and microstructures that can be present in glass-ceramics. Reference is made to that patent for further understanding of the manufacture and character of glass-ceramics.

The primary objective of the present invention was to develop very highly crystalline glass-ceramic articles wherein enstatite constitutes the predominant crystal phase; the enstatite crystals imparting high refractoriness to the articles and acting to control fracture propagation, thereby enhancing the toughness of the articles.

SUMMARY OF THE INVENTION

That objective can be achieved through the controlled heat treatment of precursor glass bodies prepared from strictly-defined ranges of components. Enstatite, when present alone, does not form a stable glass. Therefore, a secondary composition component is necessary to stabilize a glass and that component must subsequently crystallize to a refractory phase.

My research discovered five such operable refractory phases: (1) siliceous $\beta$-spodumene solid solution ($Li_2O \cdot Al_2O_3 \cdot nSiO_2$); (2) Ba-osumilite ($BaMg_2Al_6Si_9O_{30}$); (3) celsian ($BaO \cdot Al_2O_3 \cdot 2SiO_2$); (4) anorthite ($CaO \cdot Al_2O_3 \cdot 2SiO_2$); and (5) strontium feldspar ($SrO \cdot Al_2O_3 \cdot 2SiO_2$). The constituents of those phases, when melted from various batch materials along with MgO and $SiO_2$ compounds, can be utilized in forming stable glasses. When $TiO_2$- and/or $ZrO_2$-containing material is included in those glass-forming batches, the resulting glass bodies can be heat treated to yield fine-grained, very highly crystalline glass-ceramic bodies wherein enstatite composes the predominant crystal phase. Hence, the bodies will normally be greater than 90% crystalline and, frequently, over 95% crystalline. In summary, besides enstatite, which may be present in various proportions of the three polymorphs clinoenstatite, orthoenstatite, and protentstatite, crystals of tetragonal $ZrO_2$ and/or rutile, zircon, $\beta$-spodumene solid solution, Ba-osumilite, celsian, cristobalite, anorthite, and strontium feldspar may be present, depending upon the composition of the precursor batch. The enstatite crystals typically comprise at least 50% and often up to 80% by volume of the crystalline product. This very high crystallinity imparts high mechanical strength to the final products, as evidenced by modulus of rupture measurements in excess of 20,000 psi, high refractoriness, as demonstrated by use temperatures of at least 1200° C., and exceptional toughness, as illustrated by fracture toughness levels greater than 3 MPam$^{\frac{1}{2}}$.

Compositions operable to form the desired glass-ceramics consist essentially, expressed in terms of weight percent on the oxide basis, of about 20–35% MgO, 2–12% $Al_2O_3$, 40–70% $SiO_2$, and at least one metal oxide in the indicated proportions selected from the group consisting of 0–2% $Li_2O$, 0–4% CaO, 0–12% SrO, and 0–17% BaO, at least 1.5% $Li_2O$ being required when present alone and at least 1% CaO and/or SrO and/or BaO being required in the absence of $Li_2O$. Where glass-ceramic articles are to be prepared through the heat treatment of precursor glass bodies of substantial bulk, 5–15% $ZrO_2+TiO_2$, consisting of 0–15% $ZrO_2$ and 0–15% $TiO_2$, will be included in the base composition to provide nucleation. However, glass-ceramic bodies can be prepared by sintering together very finely-divided powders of the precursor glass; i.e., a nucleating agent per se is not necessary. Nucleation results from the innumerable surfaces presented by the glass powders. Examples of such sintered products include refractory fiber and whisker reinforced composites and integrated circuit packages. Where desired, up to about 2% by weight $B_2O_3$ and/or up to about 5% by weight of finely-divided $Al_2O_3$ may be added to modify the properties of those products. Nevertheless, the presence of $ZrO_2$ and/or $TiO_2$ insures adequate nucleation to provide articles of high crystallinity with relatively uniform crystal sizes.

Whereas $TiO_2$ can be employed as a nucleating agent in the above compositions, $ZrO_2$ is much preferred for that purpose since: (1) it is not easily reduced like $TiO_2$ and will not act to oxidize fibers such as SiC and $Si_2N_4$ utilized in the fabrication of fiber and whisker reinforced composite bodies; (2) unlike $TiO_2$, $ZrO_2$ does not behave as a flux to thereby reduce the refractoriness of the final product; and (3) in contrast to $TiO_2$, additions of $ZrO_2$ serve to improve glass stability in these high MgO-containing compositions.

Whereas the most favorable physical properties, particularly the highest refractoriness, will be obtained in glass-ceramics prepared from glass compositions consisting essentially solely of the above-recited constituents in the prescribed proportions, minor additions of compatible metal oxides can be tolerated as melting or forming aids, or for specifically influencing some physical characteristic of the final product. Nevertheless, the total of such additions will most preferably not exceed about 5% by weight.

Fluxes such as $Na_2O$, $K_2O$, and fluoride will most desirably be avoided. $Na_2O$ and $K_2O$ can combine with $Al_2O_3$ to form stable, non-crystallizing residual glass. Their presence does not permit the development of cristobalite crystals; on the contrary, they retain $SiO_2$ in the glassy phase. Such glassy phase leads to easier fracture propagation and reduces the refractoriness of the product; i.e., it leads to creep upon exposure to high temperatures.

A preferred range of compositions within the above base quaternary system consists essentially of about 30-34% MgO, 1-5% BaO, 2-6% $Al_2O_3$, and 60-66% $SiO_2$.

A very small composition area in the ternary system $MgO-SiO_2-ZrO_2$ was found which produced extremely refractory glass-ceramic bodies, i.e., bodies resisting melting at 1500° C., wherein enstatite constitutes the predominant crystal phase. That area comprehends compositions consisting essentially solely, expressed in terms of weight percent on the oxide basis, of about 30-35% MgO, 53-58% $SiO_2$, and 10-14% $ZrO_2$. The precursor glasses of that composition area exhibit marginal glass stability and glass bodies of bulk frequently crack during the crystallization heat treatment. Nevertheless, they are very amenable to forming glass-ceramic bodies through the sintering together of finely-divided powders. Additions of up to about 2% $B_2O_3$ and/or up to 5% $Al_2O_3$ appear to alleviate the cracking phenomenon without drastically reducing the refractoriness of the final product. Hence, the use temperatures of the resulting glass-ceramics will exceed about 1400° C.

Crystallization of the precursor glass body in situ involves exposures to temperatures within the range of about 1150°-1350° C. Where a two-stage heat treatment has been employed, the parent glass article has initially been nucleated at temperatures within the interval of about 800°-900° C. and then crystals grown on those nuclei at temperatures within the 1150°-1350° C. range.

The strength and toughness observed in the inventive glass-ceramic articles are remarkably high; especially is this so since the microstructure thereof consists of generally equigranular material with crystals of low aspect ratio. A portion of the great strength exhibited is certainly related to the high elastic modulus of enstatite; but it is believed that the highly crystalline nature and resulting interlocking microstructure probably comprise the principal contributing factors.

The high toughness is hypothesized to be due largely to the energy absorption associated with twin and cleavage planes which tend to deflect, branch, and blunt fractures. Hence, electron microscopy has illustrated crystal twinning resulting from martensitic transformation of protenstatite to clinoenstatite which occurs during cooling. Hence, the toughening mechanisms are deemed to be two: (1) the existence of the twins, themselves, including possible cracks along boundaries between the twins; and (2) splintering due to the intersection of cleavage and twin planes.

In summary, the exceptional strength and toughness of the inventive enstatite containing glass-ceramics are believed to be due to the following three factors: (a) interlocking high crystallinity; (b) crystal twinning due to the martensitic transformation from protenstatite to clinoenstatite; and (c) fracture-influencing cleavage.

PRIOR ART

U.S. Pat. No. 3,205,079 discloses the production of glass-ceramic articles consisting essentially, by weight, of about 5-28% MgO, 15-35% $Al_2O_3$, 40-65% $SiO_2$, and 5-25% $ZrO_2$. Although some of the working examples reported the presence of $MgO.SiO_2$ crystals, nowhere is there any reference to the accompanying presence of β-spodumene solid solution and/or anorthite and/or Ba-osumilite and/or celsian and/or strontium feldspar crystals. None of the working examples contained $Li_2O$, CaO, BaO, or SrO. Finally, the level of $Al_2O_3$ is higher than can be tolerated in the present inventive compositions.

U.S. Pat. No. 3,490,888 describes glass-ceramic articles, wherein cordierite comprises the predominant crystal phase, consisting essentially, in weight percent, of 9-20% MgO, 15-32% $Al_2O_3$, 0.2-1.5% $As_2O_3$, 45-62% $SiO_2$, and 7-12% $TiOx_2$. The inclusion of $As_2O_3$ serves to increase the dielectric constant of the product. Enstatite or $MgO.SiO_2$ is nowhere mentioned in the patent, although x-ray diffraction analyses were conducted on numerous working examples. The concentration of $Al_2O_3$ is greater than can be tolerated in the present inventive compositions. No reference is made to the accompanying presence of β-spodumene solid solution, anorthite, celsian, Ba-osumilite, or strontium feldspar crystals. $ZrO_2$ is nowhere mentioned.

U.S. Pat. No. 3,585,054 is directed to the chemical strengthening of glass-ceramic articles having compositions within the $MgO-Al_2O_3-SiO_2-TiO_2$ field and containing crystals selected from the group of cordierite, enstatite, spinel, stuffed β-quartz, and α-quartz. No ranges of those components are specified; the working examples yield the ranges, in parts by weight, of 12.8-21.9 MgO, 18.8-27.3 $Al_2O_3$, 48.3-56.2 $SiO_2$, and 9.1-10.0 $TiO_2$. $Li_2O$, CaO, BaO, and SrO are not indicated as consituting any portion of the composition. Consequently, no reference can be drawn of the presence of β-spodumene solid solution, Ba-osumilite, celsian, or strontium feldspar crystals.

U.S. Pat. No. 3,819,387 discusses glass-ceramic articles virtually free from $Li_2O$ and consisting essentially, in weight percent, of 4.9-6% CaO, 5-15% MgO, 13-21% $Al_2O_3$, and 44-66% $SiO_2$. $TiO_2$ in amounts of 3-15% or $Cr_2O_3$ in amounts of 0.5-5% may optionally be included to provide nucleation. Up to 10% $Na_2O$ and/or $K_2O$ may usefully be present. Crystal phases reported as being found in the articles included cristobalite, diopside ($CaO.MgO.2SiO_2$), anorthite ($CaO.Al_2O_3.2SiO_2$), gehlenite ($2CaO.Al_2O_3.SiO_2$), and enstatite. Nowhere are BaO and SrO mentioned and $Li_2O$ is explicitly excluded. Accordingly, no reference is made to the accompanying presence of β-spodumene solid solution, celsian, Ba-osumilite, and stronitum feldspar crystals. $ZrO_2$ is absent from the disclosure.

U.S. Pat. No. 3,873,329 is concerned with glass-ceramic articles containing α-quartz and sapphirine ($4MgO.5Al_2O_3.SiO_2$) as the predominant crystal phases consisting essentially, by weight, of 10-16% MgO, 20-28% $Al_2O_3$, 0.5-3.5% $B_2O_3$, 44-58% $SiO_2$, 3-9% $TiO_2$, and 3-7% $ZrO_2$. Alkali metal oxides including $Li_2O$, are desirably avoided and BaO, CaO, and SrO are nowhere mentioned.

U.S. Pat. No. 3,901,716 is drawn to glass-ceramic articles containing enstatite and diopside as the predominant crystal phases consisting essentially, in weight percent, of 5-35% $Al_2O_3$, 35-75% $SiO_2$, 0.5-3% $Cr_2O_3$, and 0.5-10% $Fe_2O_3$, $Cr_2O_3$ and $Fe_2O_3$ being nucleating agents, with 0-30% MgO and 0-30% CaO. $Li_2O$, BaO, and SrO are nowhere mentioned so, consequently, there is no indication of the accompanying crystallization of β-spodumene solid solution, Ba-osumilite, celsian, and/or strontium feldspar. No reference is made to $TiO_2$ or $ZrO_2$ and all of the working examples contained substantial quantities of CaO.

DESCRIPTION OF THE PREFERRED EMBODIMENTS

Table I lists Examples 1-10 and Examples 1A-10A, compositions coming within the base quaternary system, both in terms of parts by weight on the oxide basis, with the nucleating agent ($ZrO_2$ or $TiO_2$) reported in excess of the base composition, Examples 1-10; and in terms of parts by weight on the oxide basis with the nucleating agent included within the base composition, Examples 1A-10A. Inasmuch as the sum of the components totals or closely approximates 100, for all practical purposes the tabulated values recorded for the individual constituents of Examples 1A-10A may be deemed equivalent to weight percent.

Examples 11 and 12 of Table I illustrate compositions within the $MgO-SiO_2-ZrO_2$ ternary system yielding extremely refractory glass-ceramic bodies. Those compositions are recited in terms of weight percent on the oxide basis.

The actual batch ingredients utilized can be any materials, either oxides or other compounds, which, when melted together, will be transformed into the desired oxides in the proper proportions. For example, $BaCO_3$ can supply the source of BaO.

The batch components were compounded, ballmilled together to aid in securing a homogenous melt, and then charged into platinum crucibles. The crucibles were introduced into a furnace operating at about 1650° C. and the batches melted for about 16 hours. Thereafter, the melts were poured into a steel mold to produce slabs having dimensions of about $8'' \times 4'' \times 8''$, and those slabs were immediately transferred to an annealer operating at about 750° C. It will be appreciated that, whereas no fining agent was employed in these laboratory melts, large scale commercial melting facilities may require the inclusion of a fining agent, such as $As_2O_3$ and/or $Sb_xO_3$, in conventional amounts.

TABLE I

|  | 1 | 1A | 2 | 2A | 3 | 3A |
|---|---|---|---|---|---|---|
| $SiO_2$ | 66.5 | 57.8 | 64.0 | 56.6 | 50.5 | 45.1 |
| $Al_2O_3$ | 7.0 | 6.1 | 5.0 | 4.4 | 9.1 | 8.1 |
| MgO | 25.0 | 21.7 | 30.1 | 26.6 | 26.8 | 23.9 |
| $Li_2O$ | 1.5 | 1.3 | 1.0 | 0.9 | — | — |
| BaO | — | — | — | — | 13.6 | 12.1 |
| $ZrO_2$ | 15.0 | 13.0 | 13.0 | 11.5 | — | — |
| $TiO_2$ | — | — | — | — | 12.0 | 10.7 |

|  | 4 | 4A | 5 | 5A | 6 | 6 |
|---|---|---|---|---|---|---|
| $SiO_2$ | 50.5 | 43.9 | 48.7 | 42.3 | 52.9 | 47.0 |
| $Al_2O_3$ | 9.1 | 7.9 | 10.9 | 9.5 | 9.4 | 8.4 |
| MgO | 26.8 | 23.3 | 24.1 | 21.0 | 28.1 | 25.0 |
| BaO | 13.6 | 11.8 | 16.3 | 14.2 | — | — |
| SrO | — | — | — | — | 9.6 | 8.5 |
| $ZrO_2$ | 15.0 | 13.0 | 15.0 | 13.0 | 12.5 | 11.1 |

|  | 7 | 7A | 8 | 8A | 9 | 9A |
|---|---|---|---|---|---|---|
| $SiO_2$ | 65.0 | 57.5 | 65.0 | 56.5 | 62.4 | 55.0 |
| $Al_2O_3$ | 4.0 | 3.5 | 3.0 | 2.6 | 5.5 | 4.9 |
| MgO | 30.0 | 26.6 | 32.0 | 27.8 | 29.1 | 25.6 |
| $Li_2O$ | 1.0 | 0.9 | — | — | — | — |
| BaO | — | — | 2.0 | 1.7 | — | — |
| CaO | — | — | — | — | 3.0 | 2.6 |
| $ZrO_2$ | 13.0 | 11.5 | 13.0 | 11.3 | 13.5 | 11.9 |

|  | 10 | 10A | 11 | 12 |
|---|---|---|---|---|
| $SiO_2$ | 65.0 | 58.0 | 56.0 | 54.0 |
| $Al_2O_3$ | 6.1 | 5.4 | — | — |
| MgO | 28.0 | 25.0 | 33.0 | 33.0 |
| $Li_2O$ | 1.0 | 0.9 | — | — |
| $ZrO_2$ | 12.0 | 10.7 | 11.0 | 13.0 |

After examining the annealed slabs for glass quality, test specimens were cut from each, those specimens were placed into an electrically-fired furnace, and then subjected to the heat treatment schedules recorded in Table II. In each instance the temperature of the specimens was raised at about 5° C./minute to the dwell temperatures reported. Other heating rates can be utilized, although, in general, the rate will not be so rapid as to cause thermal deformation and slumping of the specimens. Upon completion of the heat treatment schedule, the electric current to the furnace was cut off and the crystallized speimens allowed to cool to room temperature within the furnace. Such practice has been termed "cooling at furnace rate"; the rate being estimated to average about 3°-5° C./minute. Again, it will be appreciated that such practice is merely a matter of convenience and does not constitute a substantive aspect of the invention. Table II also reports a visual description of the heat treated specimens and the crystal phases present therein as identified through x-ray diffraction analyses.

Table III lists such physical properties as linear coefficient of thermal expansion (Coef. Exp.) over the range of 25°-300° C. ($\times 10^{-7}/°C.$), abraded modulus of rupture (MOR) in terms of kpsi, fracture toughness ($K_{IC}$) in terms of $MPam^{\frac{1}{2}}$, elastic modulus (E-mod.) in terms of $10^6$ psi, and refractoriness (maximum use temperature), where determined, utilizing conventional measuring techniques.

TABLE II

| Example No. | Heat Treatment | Visual Description | Crystal Phases |
|---|---|---|---|
| 1 | 800° C.- 2 hours 1200° C.- 4 hours | White opaque, cherty fracture | Enstatite, mainly proto, some clino, β-spodumene, tetragonal ZrO$_2$ |
| 2 | 800° C.- 2 hours 1200° C. 4 hours | White opaque, cherty fracture | Enstatite, mainly proto, some clino, β-spodumene, tetragonal ZrO$_2$ |
| 3 | 800° C.- 2 hours 1200° C.- 4 hours | Gray opaque, fine-grained | Enstatite, mainly proto, some clino, celsian, rutile |
| 4 | 800° C.- 2 hours 1200° C.- 4 hours | White opaque, cherty fracture | Enstatite, mainly proto, some clino, celsian, tetragonal ZrO$_2$ |
| 5 | 800° C.- 2 hours 1200° C.- 4 hours | White opaque, cherty fracture, some deformation | Enstatite, mainly proto, some clino, celsian, tetragonal ZrO$_2$ |
| 6 | 800° C.- 2 hours 1200° C.- 4 hours | White opaque, cherty fracture | Enstatite, mainly proto, some clino, strontium feldspar, tetragonal ZrO$_2$ |
| 7 | 800° C.- 2 hours 1300° C.- 4 hours | White opaque, cherty fracture, fine-grained | Enstatite, mainly proto, some clino, β-spodumene, tetragonal ZrO$_2$ |
| 8 | 800° C.- 2 hours 1300° C.- 4 hours | White opaque, satin fracture, very fine-grained | Orthoenstatite, tetragonal ZrO$_2$, |
| 8a | 800° C.- 2 hours 1300° C.- 4 hours | White opaque, cherty fracture, fine-grained | Enstatite, mainly proto, some clino, cristobalite, tetragonal ZrO$_2$, Ba-osumilite |
| 9 | 800° C.- 2 hours 1200° C.- 4 hours | White opaque, cherty fracture, fine-grained | Enstatite, mainly proto, some clino, anorthite, tetragonal ZrO$_2$ |
| 10 | 800° C.- 2 hours 1200° C.- 4 hours | White opaque, cherty fracture, fine-grained | Enstatite, mainly proto, some clino, β-spodumene, tetragonal ZrO$_2$ |
| 11 | 800° C.- 2 hours 1400° C.- 4 hours | White opaque, cherty fracture, some cracking | Enstatite, mainly proto, some clino, cristobalite zircon, tetragonal ZrO$_2$ |
| 12 | 800° C.- 2 hours 1400° C.- 4 hours | White opaque, cherty fracture, some cracking | Enstatite, mainly proto, some clino, cristobalite, zircon, tetragonal ZrO$_2$ |

TABLE III

| Example | Coef. Exp. | MOR | K$_{IC}$ | E-Mod. | Refractoriness |
|---|---|---|---|---|---|
| 1 | — | 22.4 | — | — | 1200° C. |
| 2 | 70 | 28.0 | 3.4 | 19.3 | 1250° C. |
| 3 | — | — | — | — | 1200° C. |
| 4 | — | 27.2 | — | — | 1200° C. |
| 5 | — | — | — | — | 1200° C. |
| 6 | — | 17.3 | — | — | 1200° C. |
| 7 | — | 27.8 | 3.2 | — | 1250° C. |
| 8a | 88 | 28.7 | — | 19.8 | 1350° C. |
| 9 | — | — | — | — | 1250° C. |
| 10 | — | — | — | — | 1250° C. |
| 11 | — | — | — | — | 1500° C. |
| 12 | — | — | — | — | 1500° C. |

Electron mircoscopic examination of the microstructure of the inventive glass-ceramics has revealed the extensive incidence of transformation twinning or exsolution lamellae which are conjectured to deflect fractures. The high proportion of the polymorph protoenstatite, as observed in x-ray diffraction examinations and inferred from the measured coefficients of thermal expansion, however, leads to the conclusion that greater toughness may be realized by decreasing the proportion of protenstatite in favor of the other two polymorphs by varying the base glass compositions and/or the heat treatment parameters.

I claim:

1. A glass-ceramic article exhibiting a high modulus of rupture, a use temperature of at least 1200° C., a high fracture toughness, and a crystal content of at least 90% by volume, said article containing enstatite as the predominant crystal phase, at least one secondary crystal phase selected from the group consisting of β-spodumene solid solution, Ba-osumilite, celsian, anorthite, cristobalite, and strontium feldspar, and having a composition consisting essentially, expressed in terms of weight percent on the oxide basis, of about 20-35% MgO, 2-12% Al$_2$O$_3$, 40-70% SiO$_2$, and at least one metal oxide in the indicated proportion selected from the group consisting of 0-2% Li$_2$O, 0-4% CaO, 0-12% SrO, and 0-17% BaO, at least 0.5% Li$_2$O being required when present alone and at least 1% CaO and/or SrO and/or BaO being required in the absence of Li$_2$O, said composition being essentially free from Na$_2$O, K$_2$O, and fluoride.

2. A glass-ceramic article according to claim 1 also containing 5-15% TiO$_2$+ZrO$_2$, consisting of 0-15% TiO$_2$ and 0-15% ZrO$_2$, wherein said secondary crystal phase also contains crystals selected from the group consisting of tetragonal ZrO$_2$, rutile, zircon, and mixtures thereof.

3. A glass-ceramic article according to claim 1 consisting essentially of about 30-34% MgO, 2-6% Al$_2$O$_3$, 60-66% SiO$_2$, and 1-5% BaO.

4. A glass-ceramic article exhibiting a use temperature of 1500° C., containing enstatite as the predominant crystal phase, and having a composition consisting essentially, expressed in terms of weight percent on the oxide basis, of about 30-35% MgO, 53-58% SiO$_2$, and 10-14% ZrO$_2$.

5. A glass-ceramic article exhibiting a use temperature in excess of 1400° C., containing enstatite as the predominant crystal phase, and having a composition consisting essentially, expressed in terms of weight percent on the oxide basis, of about 30-35% MgO, 53-58% SiO$_2$, 10-14% ZrO$_2$, and up to 2% B$_2$O$_3$ and/or 5% Al$_2$O$_3$.

* * * * *